(12) United States Patent
Weisberger et al.

(10) Patent No.: US 11,796,469 B2
(45) Date of Patent: Oct. 24, 2023

(54) REAL-TIME, REFERENCE-FREE BACKGROUND ORIENTED SCHLIEREN IMAGING SYSTEM

(71) Applicant: UNITED STATES OF AMERICA AS REPRESENTED BY THE ADMINISTRATOR OF NASA, Washington, DC (US)

(72) Inventors: Joshua M. Weisberger, Newport News, VA (US); Brett F. Bathel, Yorktown, VA (US)

(73) Assignee: UNITED STATES OF AMERICA AS REPRESENTED BY THE ADMINISTRATOR OF NASA, Washington, DC (US)

( * ) Notice: Subject to any disclaimer, the term of this patent is extended or adjusted under 35 U.S.C. 154(b) by 2 days.

(21) Appl. No.: 17/725,693

(22) Filed: Apr. 21, 2022

(65) Prior Publication Data
US 2023/0123777 A1    Apr. 20, 2023

Related U.S. Application Data

(60) Provisional application No. 63/257,682, filed on Oct. 20, 2021.

(51) Int. Cl.
*G01N 21/45* (2006.01)
*G01B 11/25* (2006.01)

(52) U.S. Cl.
CPC ....... *G01N 21/455* (2013.01); *G01B 11/2513* (2013.01)

(58) Field of Classification Search
CPC .... G01N 21/455; G01B 11/2513; G01P 5/001
See application file for complete search history.

(56) References Cited

U.S. PATENT DOCUMENTS

2022/0113251 A1*  4/2022  Bathel ................ G01B 11/2513

OTHER PUBLICATIONS

Dalziel et al., "Whole-field density measurements by synthetic schlieren." Experiments in Fluids, pp. 322-335, vol. 28.
(Continued)

*Primary Examiner* — Hwa Andrew Lee
(74) *Attorney, Agent, or Firm* — Shawn P. Gorman; Trenton J. Roche

(57) ABSTRACT

A real-time reference free background oriented schlieren system is provided. One embodiment includes a display device capable of generating an image pattern projected onto a retroreflective background. A beam splitter is used to transmit a portion of the projected image pattern towards a reference image sensor and another portion of the image pattern towards the retroreflective background and past a density object. The retroreflective background reflects the projected pattern back through the beam splitter and onto a signal imaging sensor. Collected data from the reference image sensor and the signal image sensor may be processed in real-time. The image pattern may be altered as necessary without requiring a new reference image, reducing the amount of time required to set up and adjust the system. A display device may be capable of switching between a schlieren visualization capability to a shadowgraph system allowing for the use of two different imaging techniques.

19 Claims, 3 Drawing Sheets

(56) References Cited

OTHER PUBLICATIONS

Raffel et al., "On the applicability of background oriented optical tomography for large scale aerodynamic investigations," Experiments in Fluids, 2000, pp. 477-481.

Raffel et al., "Background oriented stereoscopic schlieren (BOSS) for full-scale helicopter vortex characterization," International Symposium on Flow Visualization, Aug. 22-25, 2000, pp. 450-1-450-11, 9th Edition, Edinburgh Scotland, UK.

Richard et al., Principle and applications of the background oriented schlieren (BOS) method, Meas. Sci. Technol., 2001, pp. 1576-1585, vol. 12.

Hargather et al., "Natural-background-oriented schlieren imaging," Exp Fluids, 2009, pp. 1-10, vol. 48.

Heineck et al., "Retroreflective Background Oriented Schlieren (RBOS)," ResearchGate, Conference: International Symposium for FLow Visualization, June 2010, pp. 1-14, Daegu, Korea.

M.J. Hargather, "Background-onented schlieren diagnostics for large-scale explosive testing," Shock Waves, 2003, pp. 529-536, vol. 23.

Meier et al., "Improved background oriented schlieren imaging using laser speckle illumination," Exp Fluids, 2013, pp. 1-6, vol. 54, Issue 1549.

Markus Raffel, "Background-oriented schlieren (BOS) techniques," Exp Fluids, 2015, pp. 1-17, vol. 56, Issue 60.

Hill et al., "Flow Visualization of Aircraft in Flight by Means of Background Oriented Schlieren Using Celestial Objects," 33rd AIAA Aerodynamic Measurement Technology and Ground Testing Conference, Jun. 5-9, 2017, pp. 1-13, Denver, Colorado.

Smith et al., "Retroreflective Background Oriented Schlieren Imaging Results from the NASA Plume/Shock Interaction Test," AIAA SciTech Forum, 55th AIAA Aerospace Sciences Meeting, Jan. 9-13, 2017, pp. 1-28, Grapevine, Texas.

Mark P. Wenet, "Real-time background oriented schlieren with seif-illuminated speckle background," Meas. Sci. Technol., 2020, pp. 1-7, vol. 31.

Mark P. Wernet, "Real-Time Background Oriented Schlieren: Catching Up With Knife Edge Schlieren," NASA-TM-2019-220144, 2019, pp. 1-26.

Gardner et al., "Reference-free digital shadowgraphy using a moving BOS background," Experiments in Fluids, 2020, pp. 1-5, vol. 61, Issue 44.

Heineck et al., "Background-Oriented Schlieren imaging of Supersonic Aircraft in Flight," AIAA Journal, Jan. 2021, , pp. 1-11, vol. 59, No. 1.

Nakamura et al., "Speckle beam-oriented schlieren technique," Experiments in Fluids, 2021, pp. 1-11,vol. 62, Issue 13, Springer-Verlag.

* cited by examiner

REAL-TIME, REFERENCE-FREE BACKGROUND ORIENTED SCHLIEREN IMAGING SYSTEM

CROSS-REFERENCE TO RELATED PATENT APPLICATION

This application claims the benefit under 35 U.S.C. § 119(e) to U.S. Provisional Patent Application No. 63/257,682, filed Oct. 20, 2021, entitled "REAL-TIME, REFERENCE-FREE, PROJECTION BACKGROUND-ORIENTED SCHLIEREN (BOS)," which is incorporated herein by reference in its entirety.

STATEMENT REGARDING FEDERALLY SPONSORED RESEARCH OR DEVELOPMENT

The invention described herein was made by employees of the United States Government and may be manufactured and used by or for the Government of the United States of America for governmental purposes without the payment of any royalties thereon or therefore.

BACKGROUND

Using conventional schlieren as a non-intrusive method of visualizing fluid flow fields has been a powerful tool of researchers for decades. High quality mirrors or lenses are needed, which can become prohibitively expensive for larger fields-of-view, and it requires optical through-access across a wind tunnel, for example, which is not always available for all facilities. Background-oriented schlieren (BOS), introduced in the early 2000s, is similar to conventional schlieren methods in that it is sensitive to index of refraction/density gradients. For BOS, a camera views a speckled background pattern on the opposite side of the flow of interest, and displacements/shifts in the background pattern due to the density gradients can be computed. Benefits of using BOS over conventional schlieren include: expensive mirrors/lenses are not required, optical through-access is not required, the field-of-view is only limited by the camera/lens and background size, and it is generally less time-consuming to set up.

There are several variants of the BOS technique currently in use. Large-scale BOS systems have been used to increase the field-of-view. Air-to-air BOS (AirBOS) uses the desert floor as a background, where the imaging aircraft flies above the aircraft of interest. A similar method, this time viewing up at celestial objects (e.g., the sun) is called BOS using Celestial Objects, or BOSCO. This method uses either a Calcium-K filter (CaKEBOS), or a Hydrogen-alpha filter. Retroreflective BOS (RBOS) uses a retroreflective material for the background, increasing light intensity return and allowing for shorter camera exposure times. Using laser-speckle as the illumination source with RBOS provides a highly structured background pattern using the light source itself. A non-retroreflective laser speckle system has also been recently reported on, but requires line-of-sight access across the flow of interest. Real-time BOS has also been recently demonstrated by using a self-illuminated background screen that can be adjusted on-the-fly to use the optimal background pattern, and can process results in real-time. A reference-free shadowgraph measurement uses a shifting background to avoid needing a reference image, and measures the second derivative of density.

For retroreflective BOS, commonly used in ground test facilities, the speckle pattern is sprayed/printed directly onto the retroreflective material prior to testing. The size and density of the speckle pattern must be calculated ahead of time to achieve optimal results, and once it is applied, it cannot be changed. The exact pattern can be printed onto the retroreflective backgrounds, but if spraying the pattern, the size and density is not easily controlled. High-quality, high-intensity-return retroreflective material is expensive, and if the pattern must be changed, an entirely new sheet of the retroreflective material must be used. Laser speckle RBOS does not require the spraying/printing of a speckle pattern on the retroreflective material, since it is projected onto it by the laser beam, and the constructive/destructive interference of the laser with the retroreflective material provides the pattern. While this avoids the need to re-speckle retroreflective material, changing the laser speckle size requires a change in the f number of the projecting lens. While the speckle size can indeed be changed, the range of speckle size/density remains limited. Additionally, the system becomes very sensitive to vibrations, and further, a laser safety permit is then typically required for wind tunnel testing, increasing the effort needed to ensure safe operation.

BRIEF SUMMARY

A real-time reference-free background oriented schlieren system according to various aspects of the present technology may include a display device capable of generating an image pattern that is projected onto a retroreflective background. A beam splitter may be used to transmit a portion of the projected image pattern towards a reference image sensor and another portion of the image pattern towards the retroreflective background and past a density object. The retroreflective background may be configured to reflect the projected image pattern back through the beam splitter and onto a signal imaging sensor. A processing system may have a processor and a non-transitory computer-readable medium configured to process computer-readable instructions. In one embodiment, a medium comprising computer-readable instructions that when executed, process collected data from the reference image sensor and the signal image sensor in real-time. An image pattern may then be altered as necessary without requiring a new reference image, thereby reducing the amount of time required to setup and adjust the system. The digital display device may be capable of switching between a schlieren visualization capability to a shadowgraph system allowing for the use of two different imaging techniques.

One embodiment of the technology is a projection system that can be used to reduce setup and adjustment time of a background oriented schlieren system associated with the preparation and positioning of a speckled pattern for a background oriented schlieren system.

Another embodiment of the technology is a background oriented schlieren system that does not require a separate reference measurements after initial set up.

Another embodiment of the technology is a projection system that allows for shadowgraph imaging without additional set up time.

Another embodiment of the technology is a projected background oriented schlieren system that allows for the use of polarizing optics.

Another embodiment of the technology is an imaging system that reduces glare and reflections from one or more windows between an imaging sensor and a retroreflective background.

These and other features, advantages, and objects of the present technology will be further understood and appreciated by those skilled in the art by reference to the following specification, claims, and appended drawings.

DETAILED DESCRIPTION OF EXEMPLARY EMBODIMENTS

Figure 1:
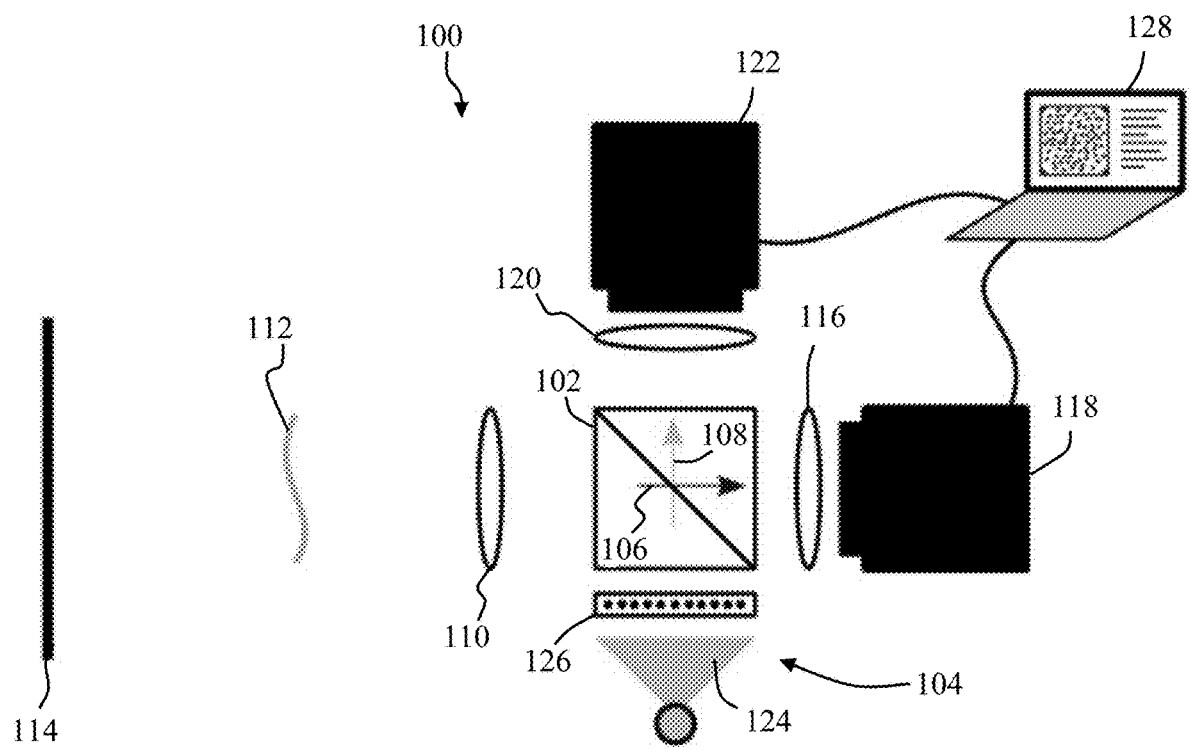
FIG. 1 representatively illustrates a schematic of a projected background schlieren system in accordance with an exemplary embodiment of the present technology.

For purposes of description herein, the terms "upper," "lower," "right," "left," "rear," "front," "vertical," "horizontal," and derivatives thereof shall relate to the technology as oriented in FIG. 1. However, it is to be understood that the technology may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

The present technology may be described in terms of functional block components and various processing steps. Such functional blocks may be realized by any number of components configured to perform the specified functions and achieve the various results. For example, the present technology may employ various optical devices, materials, and geometries, which may carry out a variety of operations. In addition, the technology described is merely one exemplary application for the disclosed device. Further, the present technology may employ any number of conventional techniques or methods of redirecting, focusing, expanding, polarizing, or manipulating any type of projected light, laser beam, or other like beam of light.

Methods and apparatus for a real-time reference-free background oriented optical system according to various aspects of the present technology may operate in conjunction with any type of image-based measurement system such as but not limited to a focusing schlieren system or a target based imaging system. Various representative implementations of the present technology may be applied to any type of image projecting device or optical measurement system for measuring one or more features on a test object, such as a density object, in a test section. Referring now to FIG. 1, in one representative embodiment, a background oriented optical system 100 may comprise a beam splitter 102 positioned to receive an image pattern from an image generator 104 and reflect a first portion of the image pattern along a signal axis 106 of the instrument and a second portion of the image pattern along a reference axis 108.

A field lens 110 may be located on a first side of the beam splitter and positioned to receive the reflected first portion of the image pattern and project the image pattern onto a retroreflective background 114. In operation, a density object 112 is positioned between the field lens 110 and the retroreflective background 114. The image pattern is passed through the density object 112 and is refracted slightly before reaching a retroreflective background 114 located on the other side of the density object 112. The retroreflective background 114 is configured to reflect the image pattern back through the density object 112 and towards the beam splitter 102.

The reflected image pattern may then be transmitted through the beam splitter 102 towards a signal imaging sensor 118. The second portion of the image pattern is transmitted through the beam splitter towards a reference imaging sensor 122. Each imaging sensor 118, 122 is configured to capture, store, save, or otherwise record the received image pattern during operation. In the case of the reference imaging sensor, the received image pattern is captured as a set of reference data representing an undisturbed image pattern. In the case of the signal imaging sensor, the image pattern is captured as a set of a signal data representing the refracted image pattern caused by the density object 112.

The signal imaging sensor 118 and the reference imaging sensor 122 may comprise any suitable device or system for capturing image data. For example, in one embodiment, the sensors 118, 122 may each comprise a digital camera positioned to capture the image data projected along either the signal axis 106 or the reference axis 108. Each camera may also comprise a focusing lens 116, 120 that is configured to allow the respective camera to focus on the targeted image pattern.

Each imaging sensor 118, 122 may be connected to one or more processing s, such as processing system 128. Processing system 128 may comprise a processor and a non-transitory computer-readable medium configured to process computer-readable instructions. The medium may be remote or local with respect to the processor. In one embodiment, the processor is configured to read instructions located on one or more mediums, such that processing system 128 is configured to receive the reference data and the signal data, compare the data in real-time as the data is received, and then calculate a set of flow data. A rate at which the flow data is calculated by the processing system may comprise any suitable value and may be limited only by the processing power of the connected processing system 128. For example, the processing system may be configured to calculate the set of flow data according to a set number of frame rates determined by the ability of a central processor to process the incoming data.

The field lens 110 may be used to focus the first portion of the image pattern onto the retroreflective background 114 to ensure a sharp clear image. The field lens 110 may comprise any suitable optical device for focusing an image onto a surface from a distance. For example, in one embodiment, the field lens may comprise a fixed lens that can have a distance between the field lens 110 and the beam splitter 102 adjusted so that the focusing distance from the field lens to the retroreflective background 114 can be adjusted. In an alternative embodiment, the field lens 110 may be positioned at a fixed distance from the beam splitter 102 and comprise a lens having an adjustable focal point.

The image generator 104 is may be configured to create and direct the image pattern towards the beam splitter 102. The image generator may comprise any suitable device or system capable of generating a desired image pattern. For example, the image pattern may comprise an opaque speckled image formed by a series of dots spread throughout a given image area. In one embodiment, the image pattern may be drawn, etched, painted, or otherwise disposed across a clear slide 126 made of glass, film, acrylic, or other optically transparent material ("speckled slide"). A light source 124 may direct an incident light through the transparent slide 126 casting the image pattern onto the beam splitter 102. The light source 124 may comprise any suitable device or system for generating an incident light or beam such as a LED light, laser, or like beam of light.

The transparent slide 126 may be positioned within a housing (not shown) that is configured to allow a first clear slide 126 having a first image pattern to be quickly changed out with a second transparent slide 126 having a second image pattern. The transparent slides 126 may be changed quickly between tests or even during an ongoing test without the need to reinitialize system components or obtain a new baseline reference image.

Figure 2:
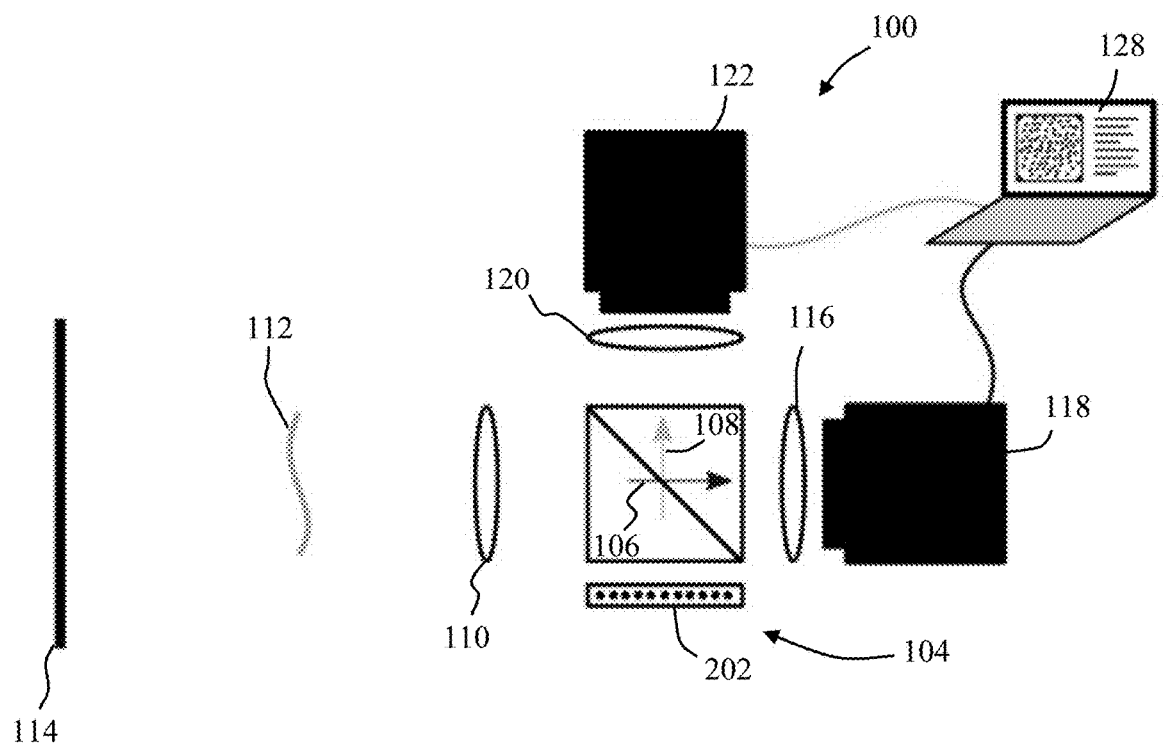
FIG. 2 representatively illustrates a schematic of an alternative embodiment of the system in accordance with an exemplary embodiment of the present technology.

Referring now to FIG. 2, in an alternative representative embodiment, the image generator 104 may comprise an LCD element 202. The LCD element 202 may comprise its own backlight or be configured to allow the light source 124 to pass through. The LCD element 202 may also be configured to display the image pattern according to a received signal such that the LCD element 202 may instantly change the size, shape, density, or any other aspect of the image pattern. This configuration provides for a more rapid transition between image patterns as opposed to the transparent slide 126 which has a set pattern. For example, the LCD element 202 may comprise a selectable pixel element that may be set to display a first desired pattern. When a different pattern is desired, a signal may be sent to the LCD element 202 causing a new image pattern to be instantly displayed.

In operation, the incident light is projected along the reference axis 108 through the speckled slide. The projected light enters the beam splitter 102, where approximately half the light is transmitted through to the reference imaging sensor 122. The other half of the light is reflected onto the signal axis 106, and projected through the field lens 110 which images the speckled slide onto the retroreflective background 114, which is placed on the opposite side of the density object 112 of interest. The reflected light from the background passes back along the signal axis 106, where half is again transmitted through the beam splitter 102 and onto the signal imaging sensor 118. Both the reference imaging sensor 122 and the signal imaging sensor 118 are connected to a processing system 128, such as a computer.

Figure 5A:
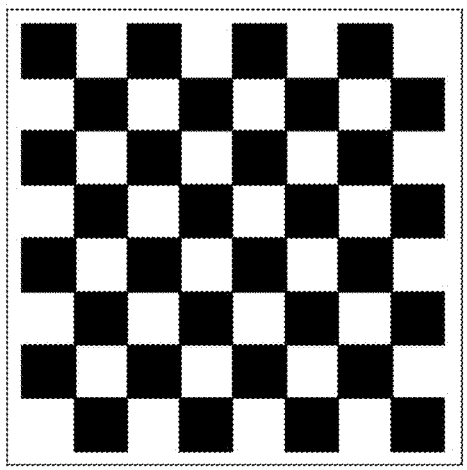
FIG. 5A representatively illustrates a reference image viewed along a reference axis in accordance with an exemplary embodiment of the present technology.
Figure 5B:
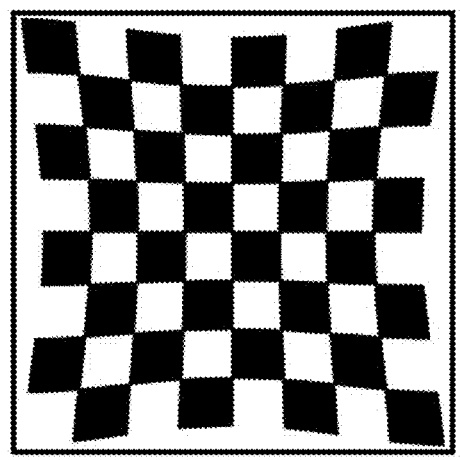
FIG. 5B representatively illustrates a signal image viewed along a signal axis in accordance with an exemplary embodiment of the present technology.

Referring now to FIGS. 5A and 5B, after the system is set up and viewing the background, a calibration pattern, such as for example a dot patterns or checkerboard image, can be displayed with the transparent slide 126 or LCD element 202, and imaged by both the reference and signal imaging sensors 122, 118. By comparing the two, a transformation matrix can be computed by the processing system 128 before testing which will ensure any distortions from the imaging sensors 118, 122 are considered, and will not result in any non-physical displacements in the calculations of the flow BOS signal. For example, a checkerboard imaged by the signal imaging sensor 118 (e.g., see FIG. 5B) may comprise pincushion distortion compared to the reference imaging sensor 122 (e.g., see FIG. 5A). This difference may then be accounted for prior to testing.

Figure 6A:
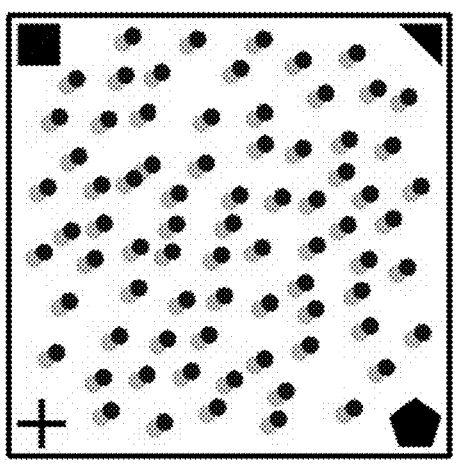
FIG. 6A representatively illustrates a combined reference image and signal image in accordance with an exemplary embodiment of the present technology.
Figure 6B:
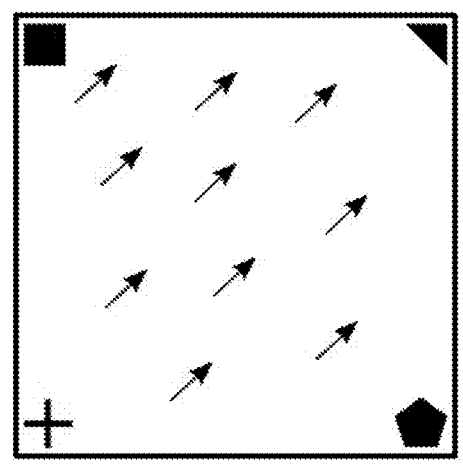
FIG. 6B representatively illustrates a representation of the displacement between the reference image and the signal image in accordance with an exemplary embodiment of the present technology.

Referring now to FIGS. 6A and 6B, during a run, two images are acquired simultaneously: one reference image from the reference imaging sensor 122 and one signal image from the signal imaging sensor 118. The reference image displays the non-altered projected speckle pattern, and will match the signal image after the transformation matrix is applied if no density object 112 were present between the field lens 110 and the retroreflective background 114. When a density object 112 is placed between the field lens 110 and the retroreflective background 114, the signal image will become distorted, with the speckle pattern displaced an amount depending on the density gradient present. A cross-correlation or optical flow calculation (or any other suitable method) is then computed between the reference and signal images, and the resulting background oriented schlieren (BOS) image can be viewed with the processing system 128. This acquisition and calculation are performed for every desired time step, and image sequences of the flow can be produced. If care is taken during acquisition, optical flow processing can be used for higher resolution results (compared to cross-correlation). Image processing in the real-time BOS method can also be implemented, and uses an FFT-based calculation. This processing method may be ideal for the disclosed technology because they both operate on the principle of having a known background speckle pattern. A benefit of the disclosed technology over that of prior art systems is that image registration is not needed here because the projection of the speckle pattern is always aligned with the signal imaging sensor 118.

In addition, during a test, the signal image is compared to the reference image in real-time. If the projected speckle pattern is not optimal, it can be changed on-the-fly to a different pattern without the need to take another flow-off reference image. The de-warp calculation from the checkerboard calibration image is still valid and can be used with the new reference/signal image calculation. The ability to change the speckle pattern for optimization of the images of the measurement region without obtaining a new flow-off reference image is what makes the system "reference-free."

Figure 3:
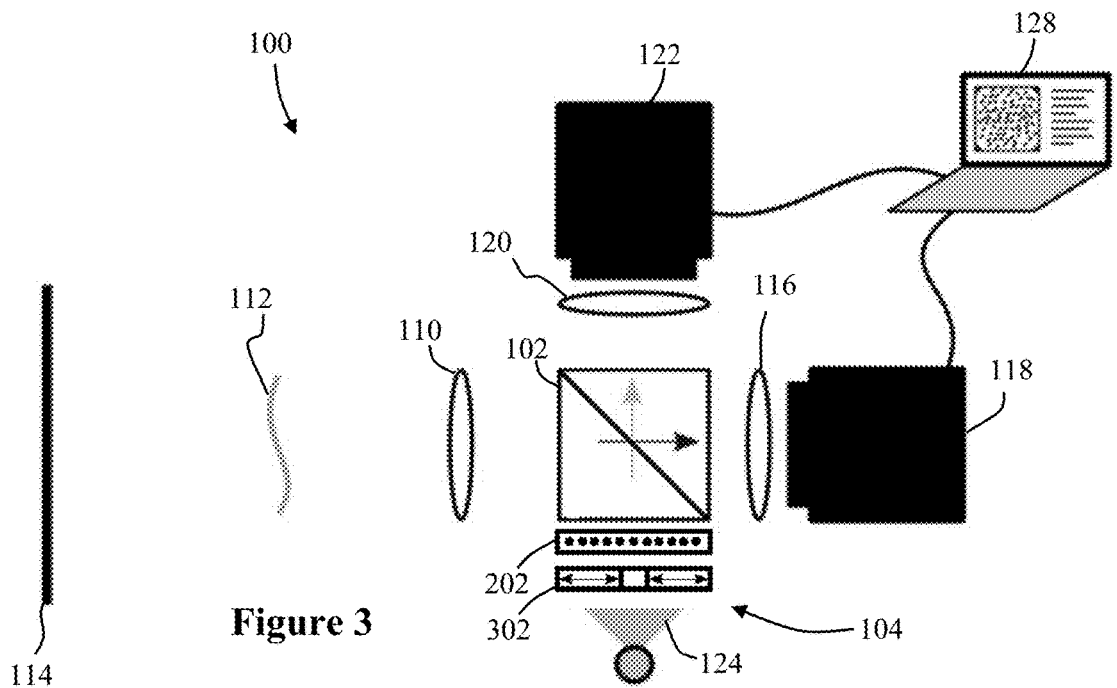
FIG. 3 representatively illustrates a schematic of an alternative embodiment of the system to generate a shadowgraph image in accordance with an exemplary embodiment of the present technology.

With reference now to FIG. 3, in yet another embodiment, a system, such as system 100, can be constructed such that both BOS and shadowgraph measurements are able to be performed. Because the retroreflective background 114 material does not require pre-speckling, the system is not limited to just BOS measurements. For this embodiment, an adjustable iris aperture 302 may be placed between the light source 124 and the LCD element 202. A transparent LCD screen can be adapted from a TFT display where the enclosure casing and the back-light are removed; this leaves a transparent LCD screen with cross polarizers on the front and back. A non-polarizing beam splitter 102 may be used here. Due to the crossed-polarizer design of LCD display, using an unpolarized light source will result in an immediate 50% reduction in intensity after the light passes through the entrance polarizer of the LCD. If, however, a linearly polarized light source is used that is aligned with the transmission axis of the entrance polarizer of the LCD, all of the light is utilized for illumination in the system. The light output from the LCD will be linearly-polarized due to the exit polarizer of LCD (which is oriented orthogonal to the entrance polarizer of the LCD, i.e., cross-polarized), and the beam splitter 102 will split the light 50/50 (transmission/reflection). To operate in BOS-mode, the iris aperture is opened all the way, and a speckle pattern is displayed on the LCD screen as discussed above. Both the reference and signal images are acquired, and the cross-correlation or optical flow (or similar) calculations is performed. To switch to shadowgraph-mode, the iris aperture is closed to a small point-source of light, and the speckle pattern is removed from the LCD screen (white screen, total transmission of light). Similarly, in the alternative embodiment described using clear slides 126, the slide 126 may be removed, repositioned, or replaced with a clear slide having no speckled pattern to achieve the same result. In shadowgraph-mode, the reference camera does not need to capture images, and the shadowgraph signal is visible on the signal imaging sensor 118 without any required image processing.

Figure 4:
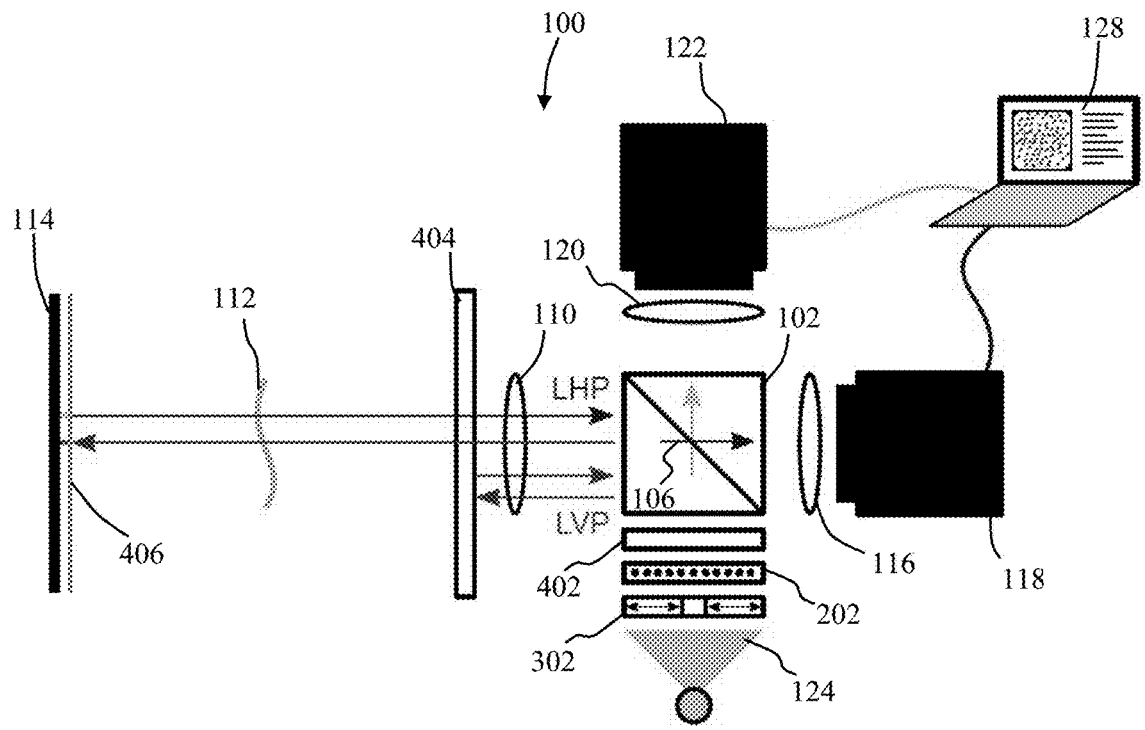
FIG. 4 representatively illustrates a schematic of the system incorporating polarizing optics in accordance with an exemplary embodiment of the present technology.

Referring now to FIG. 4, in another embodiment, a system, such as system 100, may be configured to provide polarizing optics to reduce glare caused by access windows. For example, the system 100 may be configured to comprise a set of polarization optics to reduce/eliminate on-axis window-normal light glare and reflections through an access window 404. In this embodiment, the beam splitter 102 may comprise a polarizing beam splitter configured to reflect linearly-vertically polarized (LVP) light, and transmit linearly-horizontally polarized (LHP) light. If the exit polarizer of the LCD element 202 is oriented with its transmission axis vertical, then all of the transmitted light will be reflected onto the signal axis 106, and none will transmit through the beam splitter 102 to the reference imaging sensor 122. A half-wave plate 402 (HWP) or a quarter-wave plate (QWP) may be positioned between the LCD element 202 and the beam splitter 102 to rotate the linear polarization state to any arbitrary azimuthal angle, allowing the operator of the system 100 to split any amount of light between the reference and signal imaging sensors 118, 122 (50/50, 60/40, 30/70, etc.). The LVP light reflected onto the signal axis 106 can be reflected off the window (e.g., of a wind tunnel), and retains its LVP-state, which is then reflected out of the system 100 by the beam splitter 102. The portion of LVP light that passes through the window then passes through the density object 112 of interest. The light then passes through a quarter-wave plate film 406 (QWP) that is adhered to the front surface of, or otherwise placed directly in front of the retroreflective background 114. The reflection of the LVP light at the retroreflective background 114 is then passed through the QWP 406 again and converted to LHP light. This LHP light is then transmitted through the density object again 112, through the access window 404, through the field lens 110, and transmits through the beam splitter 102 to the signal imaging sensor 118. One of ordinary skill in the will appreciate that there are certain retroreflective background materials that behave as if they have a QWP film attached to them already, and for those materials (e.g., Gaffer Power Vinyl, Hillman Prismatic), the QWP film is not required.

For operation in BOS-mode, the iris aperture 302 maybe opened wide, and a speckle pattern is displayed on the LCD element 202. The HWP 402 is adjusted to provide enough light intensity for the reference imaging sensor 122, but with most light intensity for the signal imaging sensor 118 to allow for high signal-to-noise images. In shadowgraph-mode, the iris aperture 302 may be closed down to a point-source of light, and the speckle pattern is removed from the LCD element 202, allowing all the light to transmit through. The HWP 402 is then oriented such that all the light is reflected onto the signal axis because no reference images are needed. This embodiment may be useful for wind tunnel measurements where window reflections may compromise the resulting BOS/shadowgraph images.

These and other embodiments for methods of transmitting, reflecting, and refracting light may incorporate concepts, embodiments, and configurations as described above. The particular implementations shown and described are illustrative of the technology and its best mode and are not intended to otherwise limit the scope of the present technology in any way. Indeed, for the sake of brevity, conventional manufacturing, connection, preparation, and other functional aspects of the system may not be described in detail. Furthermore, the connecting lines shown in the various figures are intended to represent exemplary functional relationships and/or physical couplings between the various elements. Many alternative or additional functional relationships or physical connections may be present in a practical system.

The description and figures are to be regarded in an illustrative manner, rather than a restrictive one and all such modifications are intended to be included within the scope of the present technology. Accordingly, the scope of the technology should be determined by the generic embodiments described and their legal equivalents rather than by merely the specific examples described above. For example, the components and/or elements recited in any apparatus embodiment may be assembled or otherwise operationally configured in a variety of permutations to produce substantially the same result as the present technology and are accordingly not limited to the specific configuration recited in the specific examples.

As used herein, the terms "comprises," "comprising," or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present technology, in addition to those not specifically recited, may be varied or otherwise particularly adapted to specific environments, manufacturing specifications, design parameters or other operating requirements without departing from the general principles of the same.

The present technology has been described above with reference to exemplary embodiments. However, changes and modifications may be made to the exemplary embodiments without departing from the scope of the present technology. These and other changes or modifications are intended to be included within the scope of the present technology, as expressed in the following claims.

What is claimed is:

1. A projected background oriented optical system for measuring a density object, comprising:
   an image generator configured to generate an incident light having a predetermined image pattern;
   a beam splitter configured to:
      reflect a first portion of the image pattern along a signal axis of the optical system; and
      transmit a second portion of the image pattern along a reference axis of the optical system;
   a retroreflective background positioned downstream of the density object to receive the transmitted image pattern and reflect the image pattern back through the density object and towards the beam splitter;

a field lens positioned between the beam splitter and the test object, wherein the field lens is configured to focus the image pattern onto the retroreflective background;

a signal imaging sensor positioned to receive the reflected image pattern transmitted through the beam splitter and collect a set of signal data;

a reference imaging sensor positioned to receive the second portion of the image pattern and collect a set of reference data; and a processing system in electronic communication with the signal imaging sensor and the reference imaging sensor, the processing system having a processor and a non-transitory computer-readable medium with computer-executable instructions that when executed by a processor, cause the processor to at least:
receive the set of signal data and the set of reference data;
compare the received sets of signal data and reference data; and
generate a set of flow data.

2. A projected background oriented optical system according to claim 1, wherein the image generator comprises:
light source configured to generate an incident light; and
a transparent slide having a predetermined pattern, wherein the transparent slide is positioned to receive the incident light and project an image pattern towards the beam splitter.

3. A projected background oriented optical system according to claim 1, wherein the image generator comprises a LCD element configured to:
generate an incident light; and
display a predetermined pattern, wherein the LCD element is positioned to project an image pattern towards the beam splitter.

4. A projected background oriented optical system according to claim 3, wherein the LCD element is further configured to:
selectively replace the predetermined pattern with a blank display; and
reduce the display to a focused point of light that is projected towards the beam splitter.

5. A projected background oriented optical system according to claim 1, further comprising:
a half-wave plate positioned between the image generator and the beam splitter; and
a quarter-wave plate positioned between the test object and the retroreflective background.

6. A projected background oriented optical system according to claim 5, wherein the beam splitter comprises a polarizing beam splitter configured to reflect LVP light along the signal axis of the instrument.

7. A projected background oriented optical system according to claim 1, further comprising:
a first focusing lens positioned between the beam splitter and the signal imaging sensor; and
a second focusing lens positioned between the beam splitter and the reference imaging sensor.

8. A method of measuring a density object with a projected background oriented optical system, comprising:
directing an incident light source having an image pattern towards a beam splitter configured to:
reflect a first portion of the image pattern along a signal axis of the optical system; and
transmit a second portion of the image pattern along a reference axis of the optical system towards a reference imaging sensor configured to store the transmitted second portion of the image pattern as a set of reference data;
projecting the first portion of the past the test object and towards a retroreflective background, wherein the retroreflective background is configured to:
receive the transmitted image pattern; and
reflect the image pattern back through the test object and towards the beam splitter;
passing the reflected image pattern through the beam splitter and towards a signal imaging sensor configured to store the reflected image patterns as a set of signal data;
processing the stored sets of reference data and signal data with a processing system connected to the reference and signal imaging sensors, the processing system having a processor and a non-transitory computer-readable medium with computer-executable instructions that when executed by a processor, cause the processor to at least:
compare the received sets of signal data and reference data; and
generate a set of flow data.

9. A method of measuring a density object with a projected background oriented optical system according to claim 8, wherein the image pattern is formed by:
light source configured to generate an incident light; and
a transparent slide having a predetermined pattern, wherein the transparent slide is positioned to receive the incident light and project an image pattern towards the beam splitter.

10. A method of measuring a density object with a projected background oriented optical system according to claim 8, wherein the image pattern is formed by an LCD element configured to:
generate an incident light; and
display a predetermined pattern, wherein the LCD element is positioned to project an image pattern towards the beam splitter.

11. A method of measuring a density object with a projected background oriented optical system according to claim 10, wherein the LCD element configured to:
selectively replace the predetermined pattern with a blank display; and
reduce the display to a focused point of light that is projected towards the beam splitter.

12. A method of measuring a density object with a projected background oriented optical system according to claim 8, further comprising:
positioning a half-wave plate between the image generator and the beam splitter; and
positioning a quarter-wave plate between the test object and the retroreflective background.

13. A method of measuring a density object with a projected background oriented optical system according to claim 12, wherein the beam splitter comprises a polarizing beam splitter configured to reflect linear vertically polarized light (LVP) light along the signal axis of the instrument.

14. A method of measuring a density object with a projected background oriented optical system according to claim 8, further comprising:
positioning a first focusing lens between the beam splitter and the signal imaging sensor; and
positioning a second focusing lens between the beam splitter and the reference imaging sensor.

15. A method of measuring a density object in a test section of an instrument with an imaging system, comprising:
  directing an incident light source having an image pattern towards a beam splitter configured to
    reflect a first portion of the image pattern as linear vertically polarized light (LVP) along a signal axis of the imaging system; and
    transmit a second portion of the image pattern along a reference axis to a reference imaging processor configured to store the transmitted image pattern as a set of reference data;
  passing the LVP light through a test window and into the test section;
  positioning a quarter-wave plate (QWP) between the test window and a retroreflective background;
  reflecting the LVP light back through the test section via the retroreflective background, wherein the LVP light is converted to LHP after passing back through the QWP;
  passing the LHP light back through the beam splitter towards a signal imaging sensor configured to store the reflected image patterns as a set of signal data;
  processing the stored sets of reference data and signal data in real-time with a processing system connected to the reference and signal imaging sensors, the processing system having a processor and a non-transitory computer-readable medium with computer-executable instructions that when executed by the processor, cause the processor to at least:
    compare the received sets of signal data and reference data; and
    generate a set of flow data.

16. A method of measuring a density object in a test section of an instrument with a projected background oriented optical system according to claim 15, wherein the image pattern is formed by:
  light source configured to generate an incident light; and
  a transparent slide having a predetermined pattern, wherein the transparent slide is positioned to receive the incident light and project an image pattern towards the beam splitter.

17. A method of measuring a density object in a test section of an instrument with a projected background oriented optical system according to claim 15, wherein the image pattern is formed by an LCD element configured to:
  generate an incident light; and
  display a predetermined pattern, wherein the LCD element is positioned to project an image pattern towards the beam splitter.

18. A method of measuring a density object in a test section of an instrument with a projected background oriented optical system according to claim 17, wherein the LCD element configured to:
  selectively replace the predetermined pattern with a blank display; and
  reduce the display to a focused point of light that is projected towards the beam splitter.

19. A method of measuring a density object in a test section of an instrument with a projected background oriented optical system according to claim 15, further comprising:
  positioning a first focusing lens between the beam splitter and the signal imaging sensor; and
  positioning a second focusing lens between the beam splitter and the reference imaging sensor.

* * * * *